(12) United States Patent
Inoue et al.

(10) Patent No.: US 8,149,427 B2
(45) Date of Patent: Apr. 3, 2012

(54) DISPATCHING PAGES FOR RASTER-IMAGE PROCESSING PRIOR TO PRINTING THE PAGES BY A PRINTING DEVICE

(75) Inventors: Tadanobu Inoue, Kanagawa-ken (JP); Kei Kawase, Tokyo (JP)

(73) Assignee: InfoPrint Solutions Company, LLC, Boulder, CO (US)

( * ) Notice: Subject to any disclaimer, the term of this patent is extended or adjusted under 35 U.S.C. 154(b) by 1377 days.

(21) Appl. No.: 11/740,864

(22) Filed: Apr. 26, 2007

(65) Prior Publication Data

US 2008/0270402 A1   Oct. 30, 2008

(51) Int. Cl.
*G06F 3/12* (2006.01)
*G06K 15/00* (2006.01)

(52) U.S. Cl. .................. 358/1.13; 358/1.17; 358/1.15

(58) Field of Classification Search .............. 358/1.15, 358/1.13, 1.17; 707/7
See application file for complete search history.

(56) References Cited

U.S. PATENT DOCUMENTS

| | | | | |
|---|---|---|---|---|
| 5,692,112 A * | 11/1997 | Brady | | 358/1.16 |
| 6,664,902 B2 * | 12/2003 | Andrew et al. | | 341/50 |
| 6,816,276 B2 * | 11/2004 | Sugano | | 358/1.15 |
| 7,352,481 B2 * | 4/2008 | Christiansen | | 358/1.13 |
| 2006/0227354 A1 * | 10/2006 | Farrell et al. | | 358/1.13 |
| 2006/0262335 A1 * | 11/2006 | Varga | | 358/1.13 |
| 2007/0195353 A1 * | 8/2007 | Tsunoda | | 358/1.13 |

FOREIGN PATENT DOCUMENTS

| | | | |
|---|---|---|---|
| JP | 1998058770 A | 3/1998 |
| JP | 1998044563 A | 2/1999 |
| JP | 1999232062 A | 8/1999 |
| JP | 2002120412 A | 4/2002 |

* cited by examiner

*Primary Examiner* — Benny Q Tieu
*Assistant Examiner* — Sunil Chacko
(74) *Attorney, Agent, or Firm* — Blakely, Sokoloff, Taylor & Zafman LLP (57) ABSTRACT

A raster-imaging processing (RIP) time is predicted for each of a number of pages to be printed in printed-page number order. The pages are sorted based at least on when RIP should be finished for each page. The pages are dispatched to RIP components for RIP at least substantially in an order in which the pages have been sorted. Each page is dispatched to a next RIP component that is available. A RIP component is available for a given page to be dispatched thereto where a total size of the RIP component's output buffer minus space within this output buffer taken up by any pages ordered after the given page in the printed-page number order is greater than the needed space to store the given page. The pages as have been raster-image processed are retrieved from the output buffers in the printed-page number order and transmitted to a printing device.

20 Claims, 5 Drawing Sheets

DISPATCHING PAGES FOR RASTER-IMAGE PROCESSING PRIOR TO PRINTING THE PAGES BY A PRINTING DEVICE

FIELD OF THE INVENTION

The present invention relates generally to printing pages by a printing device, and more particularly to dispatching the pages for raster-imaging processing prior to the printing device printing the pages.

BACKGROUND OF THE INVENTION

Within production printing environments, large numbers of pages are printed by printing devices, many times around the clock. Unlike personal or workgroup printing devices, production printing devices typically receive the pages after the pages already have been rasterized. As such, a production printing device can immediately begin to print a received page, instead of having to first convert the page from a page description language (PDL) into a rasterized format. Therefore, no time is wasted by the production printing device processing a page to rasterized format; instead, the production printing device is substantially actually outputting printed pages at all times.

As such, within a production printing environment, the pages of a print job that are to be printed in a given printed-page number order have to be rasterized (i.e., converted from a PDL to a rasterized format) prior to being transmitted to a printing device for printing. Rasterization is referred to as raster-image processing (RIP) herein. Rasterization is the process of converting text and images described in a PDL into a matrix of pixels, such as a bitmap, for actual printing by a printing device. Various conversions may take place within RIP. For example, the mathematical coordinates of vector and outline fonts, as well as vector drawings, are converted into bitmaps. Existing bitmaps may further have to be scaled into different-sized bitmaps.

Although it stands to reason that the pages of a print job would ideally be rasterized in the printed-page number order in which the pages are to be printed by a printing device, this is often not the case. Some pages require more time to rasterize than other pages do, as a result of such pages having more complex graphics or other features that require a longer time to rasterize. As a result, if the pages of a print job were rasterized in their printed-page number order, in likelihood the production printing device would not be outputting printed pages at substantially at all times, but rather would be waiting at times for the rasterization of pages having complex graphics or other features to be finished.

SUMMARY OF THE INVENTION

The present invention relates to dispatching pages for raster-image processing (RIP) prior to printing the pages by a printing device. A method of one embodiment of the invention predicts a raster-imaging processing (RIP) time for each page of a number of pages to be printed in a printed-page number order. The method sorts the pages based on when RIP should be finished for each page so that the pages are at least substantially able to be printed in the printed-page number order without having to wait for RIP of the pages, and also based on the RIP times of the pages as have been predicted.

The pages are dispatched to a number of RIP components for RIP of the pages at least substantially in an order in which the pages have been sorted, such that each page is dispatched to a next RIP component that is available. Each RIP component has an output buffer. A RIP component is considered to be available for a given page to be dispatched thereto where a total size of its output buffer minus space within its output buffer taken up by any pages ordered after the given page in the printed-page number order is greater than a needed space to store the given page. The method retrieves the pages, as have been raster-image processed, from the output buffers of the RIP components in the printed-page number order, and transmits them to a printing device for printing the pages in the printed-page number order.

In one embodiment, the pages that have been raster-imaged processed by a given RIP component are stored in its output buffer in the printed-page number order, as opposed to the order in which the pages have been sorted. As such, the pages stored within the output buffer of a given RIP component that has a lowest printed-page number of any of the pages stored within this output buffer is retrieved before any other pages stored within this output buffer are retrieved. That is, the output buffer can be reorderable output buffers in that the pages stored within them do not have to be stored in a first-in, first-out (FIFO) manner. Rather, the pages stored within the output buffer of a given RIP component can be reordered as needed. For instance, when a new page is to be stored within such an output buffer, it can be stored such that all the pages within the output buffer including this new page are sorted in the printed-page number order.

In one embodiment, the method can be performed by one or more computer programs stored on a computer-readable medium. The computer-readable medium may be a tangible computer-readable medium, like a recordable data storage medium, or an intangible computer-readable medium, like a modulated carrier signal. The computer-readable medium may be a part of an article of manufacture, as can be appreciated by those of ordinary skill within the art.

A system of an embodiment of the invention includes a raster-image processing (RIP) time predicting component, a page-sorting component, a page-dispatching component, and a page-retrieving component. The system may further include RIP components and/or a printing device. The RIP time predicting component is to predict a RIP time for each page of a number of pages to be printed in a printed-page number order The page-sorting component is to sort the pages based on when RIP should be finished for each page so that the pages are at least substantially able to be printed in the printed-page number order without having to wait for RIP of the pages, and based on the RIP times of the pages as have been predicted.

The page-dispatching component is to dispatch the pages to the RIP components for RIP of the pages at least substantially in an order in which the pages have been sorted by the page-sorting component, such that each page is dispatched to a next RIP component that is available. Each RIP component has an output buffer. A RIP component is considered to be available for a given page to be dispatched thereto where a total size of its output buffer minus space within its output buffer taken up by any pages ordered after the given page in the printed-page number order is greater than a needed space to store the given page. The page-retrieving component is to retrieve the pages, as have been raster-image processed by the RIP components, from the output buffers of the RIP components, in the printed-page number order and to transmit the pages to a printing device for printing the pages in the printed-page number order.

At least some embodiments of the invention provide for advantages over the prior art. One embodiment of the invention sorts the pages based on when RIP should be finished for each page, and dispatches the pages for RIP at least substantially in the order in which they have been sorted. The pages may be dispatched for RIP in this embodiment in this relative order, as opposed to being dispatched for RIP based on the actual deadlines when the pages are supposed to be printed. Therefore, even if it is not possible to dispatch the pages for RIP based on the actual deadlines when the pages to are supposed to be printed, the RIP and printing processes are not terminated, and are still performed (albeit late), unlike in the prior art.

One embodiment of the invention further dispatches the pages to RIP components that are available. Therefore, if a given RIP component finishes performing RIP of a given page, it can become available to receive a new page to RIP. The given RIP component may finish RIP of a given page earlier than the predicted RIP time, for instance. In this embodiment of the invention, the RIP component is immediately available to receive a new page to RIP. This is in contradistinction with the prior art, in which a RIP component is scheduled at a given time to perform RIP on a given page, and if it finishes early, a new page is not provided to the RIP component until a previously allocated time, which reduces performance.

One embodiment of the invention also permits the pages that have been raster-image processed to be stored within the output buffers of the RIP components in a reorderable fashion, instead of in a first-in, first-out (FIFO) manner. This is advantageous, because the pages are retrieved from the output buffers in the printed-page number order in which the pages are to be printed by the printing device. As such, the pages can be dispatched to the RIP components in an order that is different than this printed-page number order—i.e., in an order that maximizes utilization of the RIP components—since the pages (after having been raster-image processed) can be reordered as need be within the output buffers. Such flexibility of storage of the pages within the output buffers of the RIP components permits correspondingly greater flexibility in how the pages are dispatched to the RIP components in the first place. Maximizing utilization of the RIP components in this way ensures greater performance and provides fault tolerance, neither of which are provided by the prior art.

At least some of the invention further can be employed within commercial high-speed continuous-feed production printing device environments. In particular, the RIP time prediction of the pages of print jobs, and sorting of the pages of print jobs for dispatch to the RIP components to maximize utilization of the RIP components, allows for even tens of thousands or millions of pages to be processed and printed. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
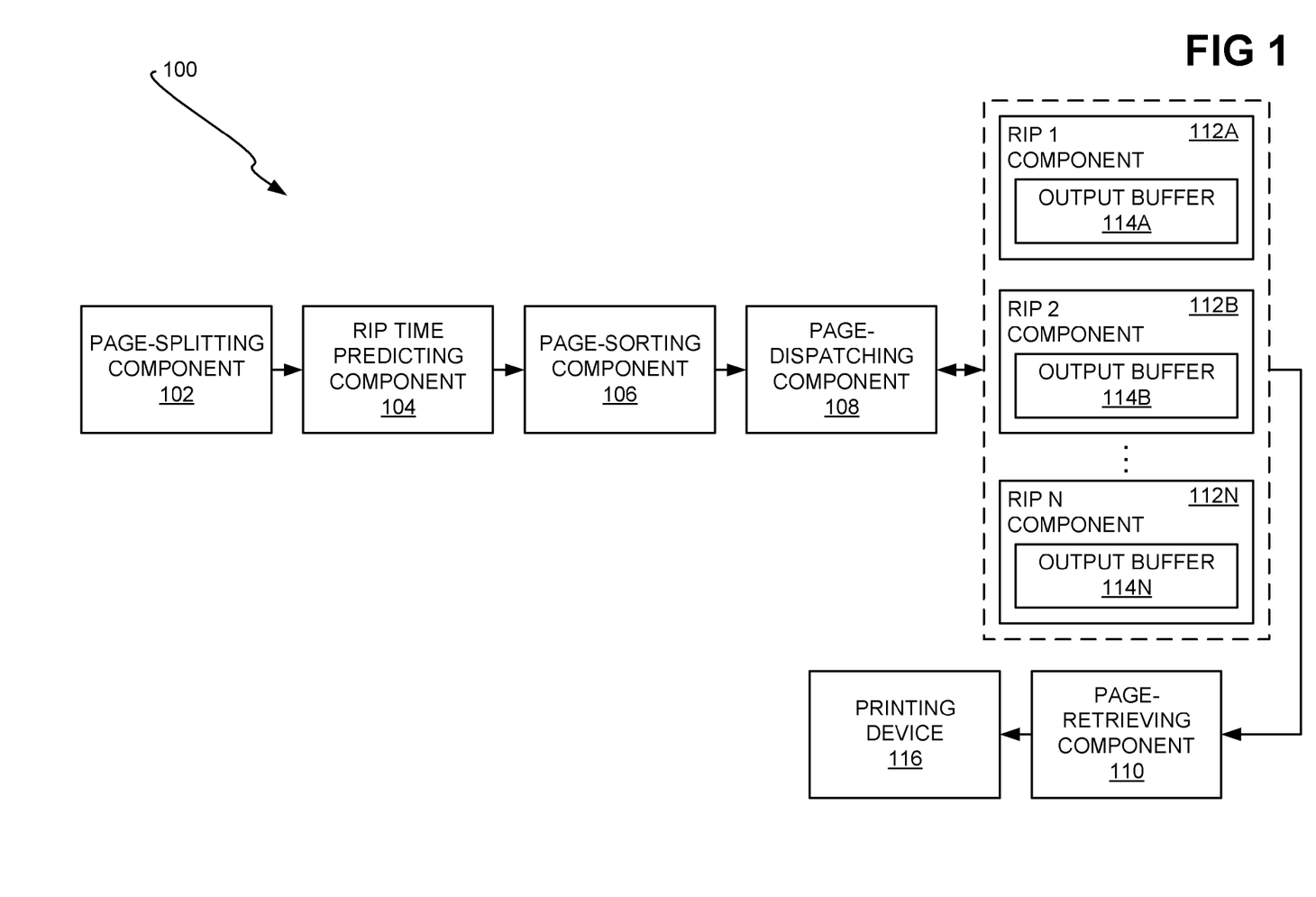
FIG. 1 is a diagram of a system within which raster-image processing (RIP) is performed, according to an embodiment of the invention.

FIG. 1 shows a system 100, according to an embodiment of the invention. The system 100 can include a page-splitting component 102, a raster-image processing (RIP) time predicting component 104, a page-sorting component 106, a page-dispatching component 108, and a page-retrieving component 110. The components 102, 104, 106, 108, and 110 may be implemented in software, hardware, or a combination of software and hardware. The system 100 can further include a number of RIP components 112A, 112B, . . . , 112N, collectively referred to as the RIP components 112, and which have output buffers 114A, 114B, . . . , 114N, collectively referred to as the output buffers 114. The components 112 may likewise be implemented in software, hardware, or a combination of software and hardware. The system 100 can also include a printing device 116, which may be or include one or more laser-printing devices, such as laser printers, inkjet-printing devices, such as inkjet printers, or other types of printing devices.

Figure 2A:
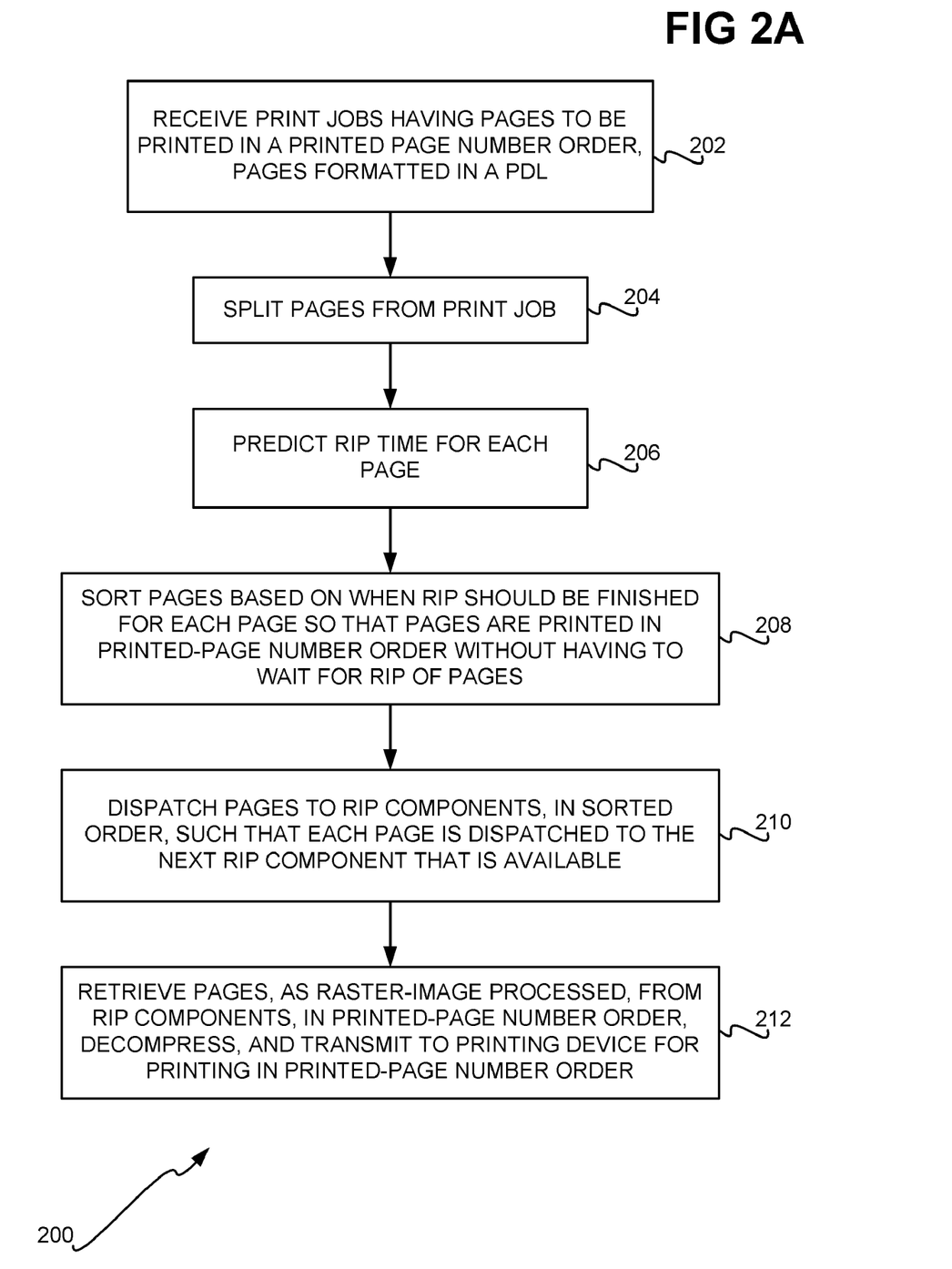
FIGS. 2A, 2B, 2C, 2D, and 2E are flowcharts of methods in which pages are dispatched for performing RIP and for retrieving the pages after RIP has been performed for printing, as well as a diagram depicting example pages before and after sorting, according to an embodiment of the invention.

The operation and functional of the system 100 is described with particular reference to FIGS. 2A, 2B, 2C, 2D, 2E, 3, and 4. FIG. 2A shows a method 200, according to an embodiment of the invention. As with the other methods of embodiments of the invention, the method 200 may be implemented as one or more computer programs stored on a computer-readable medium. The medium may be a tangible computer-readable medium, such as a recordable data storage medium, or another type of computer-readable medium.

The page-splitting component 102 receives print jobs having pages to be printed in a printed-page number order (202). The pages are formatted in a page description language (PDL), such as PostScript, a printer control language (PCL), or another type of PDL. That the pages are to be printed in a given printed-page number order means that there is a page one that is to be printed first, followed by a page two that is to be printed second, and so on. It is noted, however, that the printed-page number order may not necessarily correspond to the page numbers on the pages themselves. For instance, in some situations, the pages may be printed from back to front, such that the last page is printed first, and the first page is printed last. The printed-page number order particularly specifies the order in which the pages are to be printed. Thus, even if the last page is printed first, it is page one in the printed-page number order, and, likewise, even if the first page is printed last, it is the last page in the printed-page number order.

That the pages are formatted in a PDL means that processing has to be performed on the pages prior to them being able to be printed by the printing device 116. That is, the PDL-formatted pages are not able to be directly printed by the printing device 116, such as by the printing engine of the printing device 116. In particular, the pages have to be rasterized (i.e., converted from a PDL to a rasterized format) prior to being transmitted to a printing device for printing. Rasterization is referred to as raster-image processing (RIP) herein. Rasterization is the process of converting text and images described in a PDL into a matrix of pixels, such as a bitmap, for actual printing by a printing device. Various conversions may take place within RIP. For example, the mathematical coordinates of vector and outline fonts, as well as vector drawings, are converted into bitmaps. Existing bitmaps may further have to be scaled into different-sized bitmaps.

The page-splitting component 102 further splits apart the pages that have been received as part of the print jobs (204). That is, the print jobs typically include one or more groupings of data that each represents a number of pages of a given print job. The page-splitting component 102 splits this data so that there are a number of data files or data structures, for instance, each of which represents one page. Splitting the print jobs into separate pages in this way allows for the pages to be processed independently from one another, as can be appreciated by those of ordinary skill within the art.

The page-splitting component 102 transmits the individual pages to be printed to the RIP time predicting component 104, which predicts the RIP time for each page (104). The RIP time for a given page is the length of time it is expected to take to perform RIP on that page. Embodiments of the invention are not limited by the approaches that can be employed to predict the RIP time for each page to be printed, and such RIP time prediction may be achieved as is accomplished conventionally, as can be appreciated by those of ordinary skill within the art.

While the RIP time for a given page is desired to be predicted accurately, in at least some situations it may not be. For instance, the RIP time may be underestimated or overestimated for a given page to be printed. It is further noted that the RIP times for the pages are likely to vary from one another. Pages having complex graphics or other features, for instance, are likely to require more RIP time than pages having just text and/or simple graphics or other features. As such, it is generally not presumed that each page has the same RIP time. Furthermore, in general it can be said that the RIP time for each page is predicted based on one or more attributes of the page, such as whether a page includes graphics, text, the complexity of the graphics and text, and so on.

The RIP time predicting component 104 transmits the pages and the RIP times that it has predicted to the page-sorting component 106, which sorts the pages based on when RIP should be finished for each page and based on the RIP times of the pages as have been predicted (208). Such sorting is achieved so that the pages are desirably printed in printed-page number order without having to ever wait for the RIP of any given page(s) to be completed. That is, if RIP is performed on the pages in the printed-page number order, a situation can occur in which the printing device 116 is waiting for pages to be rasterized, which decreases the efficiency and performance of the printing process. By sorting the pages in this manner, efficiency and performance of the printing process is desirably increased, such that the printing device 116 is substantially prevented from having to wait for any page to be rasterized. As such, the sorted order of the pages is not necessarily the same as, and is likely different than, the printed-page number order of the pages.

Figure 2B:
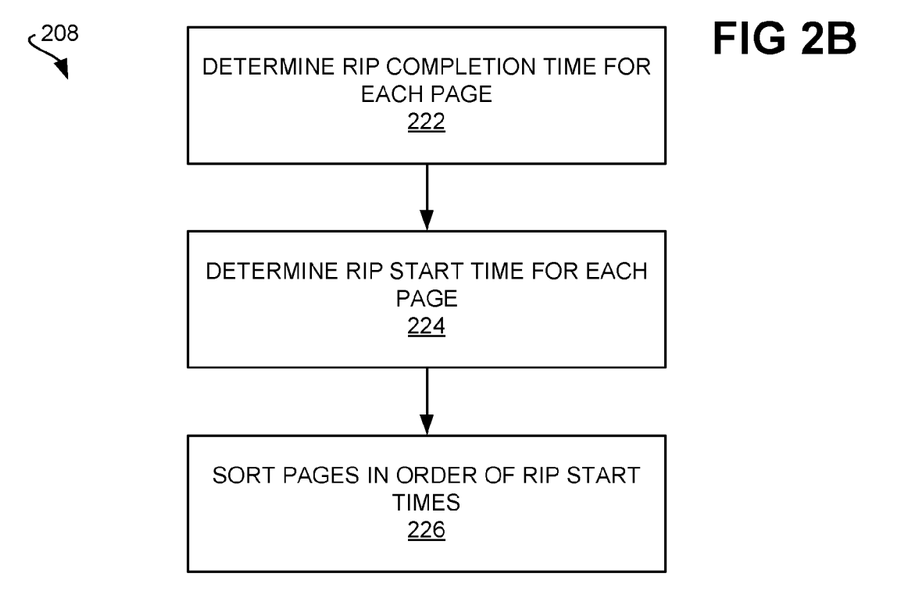

FIG. 2B shows a method for implementing part 208, according to an embodiment of the invention. First, the RIP completion time for each page is determined (222). The RIP completion time of a page is when RIP should be completed for that page so that the printing device does not have to wait for RIP to be finished prior to printing the page. That is, once a given page in the printed-page number order is printed by the printing device, the printing device fully expects to be able to retrieve the next page in the printed-page number order. Therefore, RIP should be finished on the next page so that the printing device can print this page when printing of the previous page has been completed.

Unlike the RIP prediction time for a page, which is the length or duration of time that it is expected for RIP to be performed on that page, the RIP completion time for a page is a relative or absolute time as to when RIP of that page should be completed. That is, examples of RIP prediction time may be ten milliseconds, two minutes, and so on, whereas examples of RIP completion time may be 5:00 AM, time "$t_0$" (as opposed to a subsequent time "$t_1$," for instance), and so on—RIP completion times are not lengths or durations of time. Generally, then, the RIP completion time of a given page occurs before the RIP completion times of any pages after the given page in the printed-page number order in which the pages are to be printed. Likewise, the RIP completion time of a given page occurs after the RIP completion times of any pages before the given page in the printed-page number order.

Next, the RIP start time for each page is determined (224). The RIP start time, like the RIP completion time, is an absolute or relative time, and is not a duration or length of time like the predicted RIP time is. The RIP start time for a given page is the absolute or relative time when RIP should be started for the page. The RIP start time for a given page is determined based on the RIP completion of the given page, as well as on the predicted RIP time of this page. Specific approaches for determining RIP completion time in part 222 and determining RIP start time in part 224 are described later in the detailed description.

Finally, the pages are sorted in the order of their RIP start times (226). Those of ordinary skill within the art can appreciate that any type of sorting technique can be employed in this respect. By sorting the pages in the order of their RIP start times, it is at least substantially guaranteed—depending on the accuracies of the predicted RIP times—that the printing device 116 is unlikely to have to wait for RIP to be finished on a page that the printing device 116 is expecting to print next.

Figure 2C:
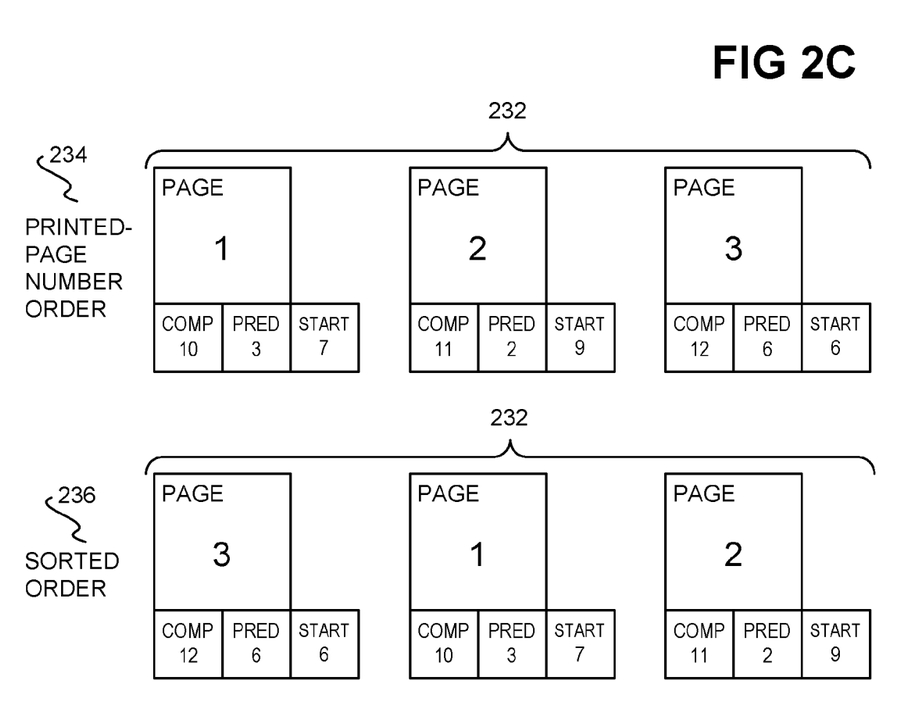

FIG. 2C shows an example of the difference between the printed-page number order in which pages are to be printed by the printing device 116, and the sorted order in which RIP is to first be performed on these pages, according to an embodiment of the invention. There are three example pages 232. In the printed-page number order 234, these three pages 232 include page one, page two, and page three. As such, page one is to be printed first, followed by page two, and then followed by page three.

As indicated in FIG. 2C, the RIP completion times of pages one, two, and three are t=10, t=11, and t=12, respectively. This means that the printing device 116 expects that RIP is to be completed by time t=10 for page one, so that it can print page one first, that RIP is to be completed by time t=11 for page two, so that it can print page two second, and that RIP is to be completed by time t=12 for page three, so that it can print page three last. As also indicated in FIG. 2C, the predicted RIP times of pages one, two, and three are 3, 2, and 6, respectively. This means that RIP of page one is expected to take three time units, that RIP of page two is expected to take two time units, and that RIP of page three is expected to take six time units. Finally, FIG. 2C indicates that the RIP start times of pages one, two, and three are t=7, t=9, and t=6 respectively.

Thus, RIP for page one should be started at time t=7, RIP for page two should be started at time t=9, and RIP for page three should be started at time t=6, so that the printing device 116 substantially never has to wait for RIP to be completed for a given page when it wants to print that page. Therefore, the sorted order 236 of the pages 232, in which the pages 232 are sorted by their RIP start times, is that page three is to have RIP performed on it first, desirably starting no later than at time t=6. Page one is to have RIP performed on it second, desirably starting no later than at t time t=7. Finally, page two is to have RIP performed on it third, desirably starting no later than at time t=9.

The sorted order 236 of the pages 232 is thus different than the printed-page number order 234. However, performing RIP on the pages 232 in the sorted order 236 ensures that printing of the pages 232 in the printed-page number order 234 is performed more efficiently than if RIP were performed on the pages 232 in the printed-page number order 234. This is because RIP of page three is predicted to take significantly longer than RIP of pages one and two. As such, RIP of page three should be started before RIP of pages one and two is performed.

Figure 2D:
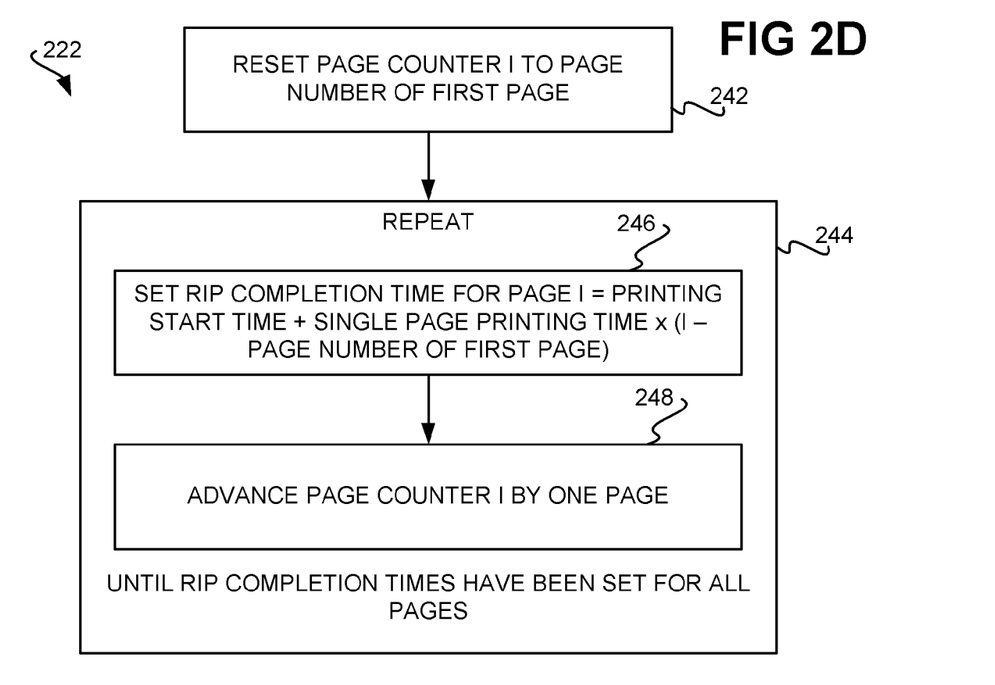

FIG. 2D shows a method for implementing part 222 of FIG. 2B, according to an embodiment of the invention. That is, the method of FIG. 2D is for determining the RIP completion time of each page. A page counter I is reset to the printed page number of the first page (242). For instance, this may be page number zero or one, depending on the numbering scheme that is employed. Next, the following is repeated until RIP completion times have been set for all the pages (244).

First, the RIP completion time for page I is set equal to a printing start time for the job as a whole, plus a single page printing time times the difference between I and the page number of the first page (246). The printing start time is thus the time at which the printing device 116 is to begin printing the print job in question that encompasses the pages for which RIP completion times are being determined. Stated another way, the printing start time is the time at which the printing device 116 is to begin printing the first page within the printed-page number order.

The printing start time is an absolute or relative time, and is not a length or duration of time. The single page printing time is a length or duration of time that it takes for the printing device 116 to print a single page after that page has been raster-image processed. The single page printing time is the same for any page to be printed, unlike, for instance, the RIP time for a page, which may be different than the RIP times for other pages. The difference between I and the page number of the first page can be considered a difference value that is equal to the difference of the page number of the current page, as represented by I, and the page number of the first page in the printed-page number order. For the first page, this difference value is zero; for the second page, this difference value is one; and so on. The page counter I is advanced by one page (248), and part 246 is repeated for the new page identified by the page counter I.

Figure 2E:
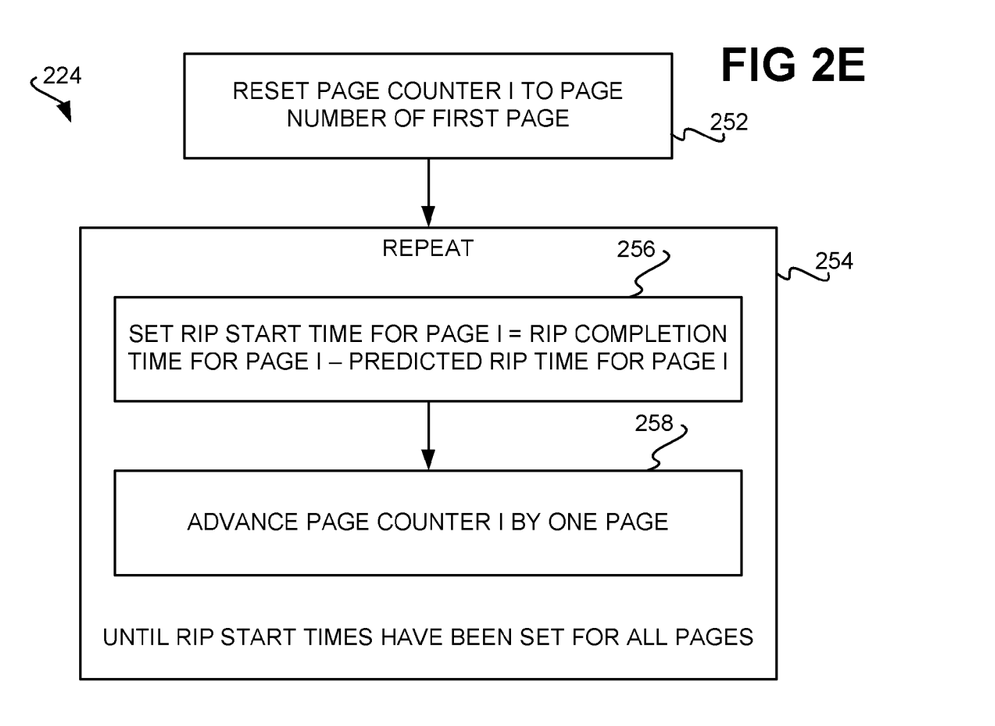

FIG. 2E shows a method for implementing part 224 of FIG. 2B, according to an embodiment of the invention. That is, the method of FIG. 2E is for determining the RIP start time for each page. A page counter I is again reset to the printed page number of the first page (252). Next, the following is repeated until the RIP start time has been determined for each page (254). In particular, the RIP start time for page I is set equal to the RIP completion time for page i minus the predicted RIP time for page I (256). Thus, the absolute or relative time at which RIP is to start for page I is equal to the time at which RIP is to be completed for this page, minus how long RIP is expected to take for page I. The page counter I is advanced by one page (258), and part 256 is repeated for the new page identified by the page counter I.

Referring back to FIG. 2A, the page-sorting component 106 transmits the pages and the sorted order to the page-dispatching component 108, which dispatches the pages to the RIP components 112 for RIP at least substantially in the order in which they have been sorted in part 208 (210). Dispatch is accomplished in a round-robin order, when plural RIP components are ready to RIP. A page is dispatched for RIP to RIP component 112A, then a page is dispatched for RIP to RIP component 112B, and so on, until a page is dispatched for RIP to RIP component 112N, at which time another page is dispatched for RIP to RIP component 112A again, and so on. Each page is therefore dispatched to the next RIP component that is available. If RIP component 112B completes RIP before RIP component 112A, the next page will be dispatched to RIP component 112B without waiting for the RIP completion of component 112A. In one embodiment, importantly, a page is dispatched for RIP to each RIP component in the order of the RIP components, where if a RIP component is unavailable to take the next page in the sorted order, a different page is dispatched to that RIP component and the original page that would have been dispatched to the RIP component is instead dispatched to a different RIP component For example, the next two pages in the sorted order may be page six followed by page five. The RIP component 112A may have just been dispatched a page, such that it is now the turn of the RIP component 112B to be dispatched a page. However, the RIP component 112B may not be available to receive page six (why this can be the case is described in the next paragraph of the detailed description). The RIP component 112B may, though, be available to receive page five. Therefore, the RIP component 112B is dispatched page five, and page six is reserved for dispatch to another RIP component (or to the RIP component 112B the next time this RIP component is reached during the dispatch process). As such, dispatching the pages to the RIP components 112 for RIP occurs at least substantially in the order in which they have been sorted—but not necessarily exactly in this order, where it is the turn of a given RIP component to have a page dispatched thereto, and where this given RIP component is unavailable to receive the next page in the sorted order.

A RIP component is available for a given page to be dispatched to the RIP component in one embodiment as follows. The output buffer of the RIP component has a total size. The output buffer of the RIP component further may have space taken up by one or more pages that have been raster-image processed (and compressed in one embodiment, as is described later in the detailed description). If the total size of the output buffer of the RIP component in question, minus the space specifically taken up by any pages that are ordered after the given page in the printed-page number order, is greater than the space needed to store the given page after RIP (and compression in one embodiment), then it is said that the RIP component is available to have the given page dispatched thereto.

This test in the last sentence of the previous paragraph is now explained in some more detail. First, it is noted that the space that is subtracted from the total size of the output buffer is just the space taken up in the buffer by pages that have been raster-image processed (and compressed in one embodiment) that are ordered after the given page in the printed-page number order. That is, the space taken up by pages before the given page in the printed-page number order is not considered. This is because such pages will necessarily be printed before the given page in question is printed. As such, by the time the given page has to be printed, such pages that are before the given page in the printed-page number order will already have been removed from the output buffer for printing, such that the space taken up by them is not considered. By comparison, pages after the given page in the printed-page number order that are taking up space in the output buffer are considered, because they will still be in the output buffer when it is time to print the given page in question.

Second, it is not necessarily known a priori how much space is needed to store a given page before the given page is raster-image processed (and compressed in one embodiment). Therefore, for purposes of performing the test to determine whether a given RIP component is able to have a given page dispatched thereto, it can be assumed that a worst case scenario of space may be needed for the page within the output buffer. For example, compression may likely result in the raster-image processed page typically taking 40-60 megabytes, but in a worst case scenario, even after compression in one embodiment, such a raster-image processed page may take up to 460 megabytes. Therefore, the latter value is employed as the needed space to store a given page when determining whether the output buffer of a given RIP component has sufficient available space, even if all likelihood the needed space will be less.

It is noted that there is a bi-directional arrow between the page-dispatching component 108 and the RIP components 112 in FIG. 1. This is because the page-dispatching component 108 inquires of the RIP components 112 how much space is available within their output buffers 114 (and possibly the total sizes of these buffers 114 if such information is not known a priori). Such inquiry is made so that the page-dispatching component 108 can determine whether a given RIP component is available to have dispatched thereto a given page, as has been described.

Next, in the method 200 of FIG. 2A, the page-retrieving component 110 retrieves the pages, as have been raster-image processed by the RIP components 112, from the output buffers 114 of the RIP components 112 in the printed-page number order, and transmits the pages in this printed-page number order to the printing device 116 (110). In one embodiment, the page-retrieving component 110 may look for the next page in the printed-page number order within each of the output buffers 114 until it locates the desired page. In another embodiment, the page-retrieving component 110 may request the next page from all the output buffers 114, and the buffer 114 that actually is storing the page provides it to the component 110. Transmitting the pages in the printed page-number order to the printing device 116, by the page-retrieving component 110, ensures that the pages are printed by the printing device 116 in the printed page-number order. Furthermore, in one embodiment where the RIP components 112 compress the pages after RIP before storing them in the output buffers 114, the page-retrieving component 110 decompresses the pages before transmitting them to the printing device 116.

A detailed example is now provided as to performance of parts 210 and 212 of the method 200 of FIG. 2A in relation to a particular RIP component 112A having an output buffer 114A that is 512 megabytes in size. In this example, it is presumed that page 20 in the printed-page number order has already been raster-imaged processed (and compressed in one embodiment) and stored in the output buffer 114A, and that this page takes up 60 megabytes in the output buffer 114A. It is further presumed that the worst case scenario of storage of any given page in the output buffer 114A is 460 megabytes. That is, the needed space to store a page in the output buffer 114A is presumed to be 460 megabytes when determining whether the RIP component 112A is able to have a given page dispatched thereto. Finally, it is presumed that the sorted order of pages to be dispatched to the RIP components 112 next is page 18, followed by page 16, followed by page 24, followed by page 22, and followed by page 25, where page X is the X-th page in the printed-page number order.

Therefore, the page-dispatching component 108 determines whether the RIP component 112A is able to have the next page in the sorted order, page 18, dispatched thereto. The total size of the output buffer 114A is 512 megabytes, and the worst case scenario of the space needed by page 18 within the output buffer 114A is 460 megabytes. Because page 20 already takes up 60 megabytes within the buffer 114A, however, and page 20 is after page 18 in the printed-page number order, the RIP component 112A is unavailable to have page 18 dispatched thereto. Therefore, the page-dispatching component 108 reserves page 18 for dispatch to a different RIP component (e.g., such as RIP component 112B), and instead attempts to dispatch page 16 to the RIP component 112A. However, the same analysis holds for page 16, such that the RIP component 112A is also unavailable to have page 16 dispatched thereto.

The next page in the sorted order is page 24. The RIP component 112A is available to have page 24 dispatched thereto. This is because the only page within the output buffer 114A is page 20 currently, and page 20 is before page 24 in the printed-page number order, such that it is not considered when determining whether the RIP component 112A is available to have page 24 dispatched thereto. Thus, the RIP component 112A accepts page 24. For sake of example, it is assumed that after RIP (and compression in one embodiment), page 24 takes up 40 megabytes within the output buffer 114A. Thus, there are two pages within the output buffer 114A now: page 20, taking up 60 megabytes, and page 24, taking up 40 megabytes.

Now, for further sake of example, what is discussed is whether pages 22 and 25, which are next in the sorted order, can be dispatched to the RIP component 112A. Note in actuality, once page 20 has been dispatched to the RIP component 112A, pages have to be dispatched to the other RIP components before another page is dispatched to the RIP component 112A. However, it is useful for explanation purposes to see whether the RIP component 112A is available for the dispatch of pages 22 and 25 as well. As such, this example is completely hypothetical, and discounts the fact that other RIP components have to have pages dispatched to them before the RIP component 112A is dispatched another page.

First, as to page 22, the RIP component 112A can be dispatched this page. This is because the total size of the output buffer 114A, 512 megabytes, minus the space taken up by the only page within the buffer 114A that is greater in printed-page number order than page 22, which is the 40 megabytes taken up by page 24 (i.e., the 60 megabytes taken up by page 20 is not considered), equals 472 megabytes, which is greater than the worst case scenario of 460 megabytes to be taken up by page 22. Therefore, page 22 is dispatched to the RIP component 112A, and it is presumed that after RIP (and compression in one embodiment), page 22 takes up 30 megabytes. Thus, there are now three pages in the output buffer 114A: page 20 taking up 60 megabytes, page 22 taking up 30 megabytes, and page 24 taking up 40 megabytes.

Now, as to page 25, the RIP component 112A can also be dispatched this page. This is because there are now pages within the output buffer 114A that are greater in the printed-page number order than page 25—the pages 20, 22, and 24 are all less than page 25 in the printed-page number order. As such, these pages will be retrieved from the output buffer 114A, and removed from the buffer 114A, before page 25 has to be stored in the output buffer 114A. Thus, the total size of the output buffer 114A, 512 megabytes, is greater than the worst case maximum space taken up by page 25, 460 megabytes, such that the RIP component 112A is available for dispatch of page 25.

Figure 3:
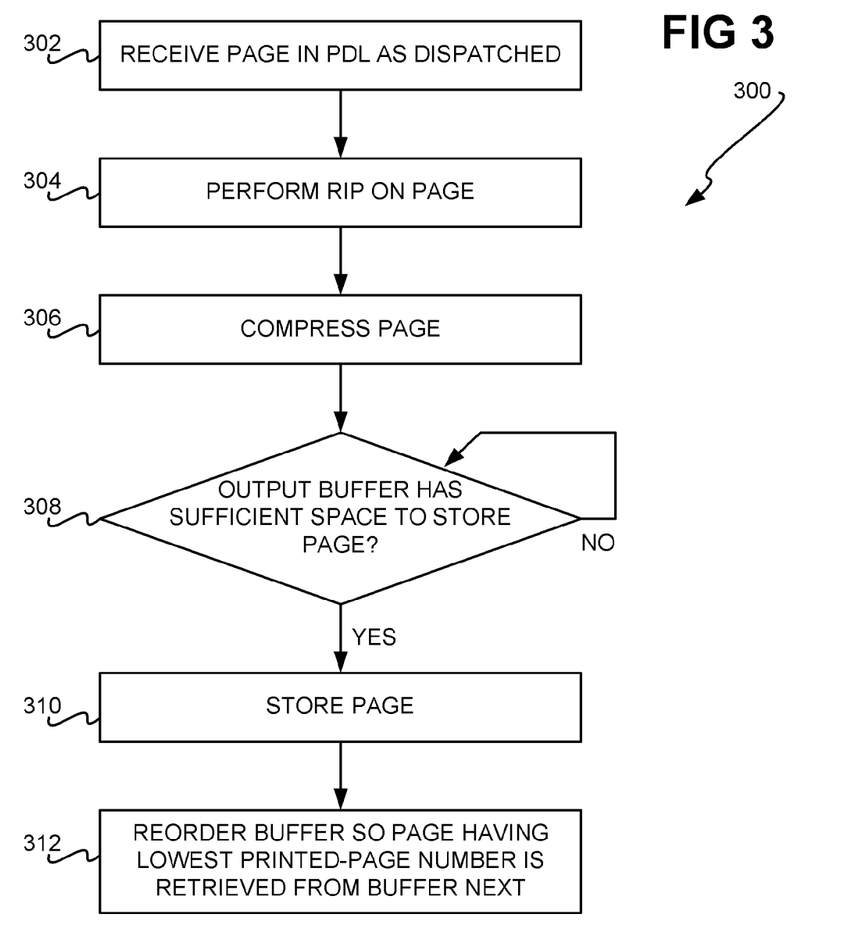
FIG. 3 is a flowchart of a method performed by a RIP component, according to an embodiment of the invention.

FIG. 3 shows a method 300 for what occurs within a RIP component when a page is dispatched thereto, according to an embodiment of the invention. The method 300 is used in particular to describe the nature of the output buffers 114 of the RIP components 112 as being inherently or intrinsically reorderable, as opposed to being first-in, first-out (FIFO) buffers. That is, the pages are stored in a given output buffer in the printed-page number order, such that the page that has the lowest page number in the printed-page number order is retrieved from the buffer by the page-retrieving component 110 first. However, because the pages are dispatched to the RIP components in a sorted order that is not necessarily the same as the printed-page number order, this means that a page having a higher page number may be stored in an output buffer before a page having a lower page number is stored. Therefore, the latter page has to be stored in the output buffer in such a way so that it is retrieved first—i.e., the pages are stored in the output buffer such that they can be reordered so that the page having the lowest page number is always retrieved first by the page-retrieving component, even if this page is not stored in the output buffer before other pages having higher page numbers are.

In any case, a RIP component receives a page from the page-dispatching component 108 (302). The page is formatted in accordance with a PDL. It is noted that the page-dispatching component 108 has already checked to ensure that the RIP component is available for receiving the page in question. The RIP component thus performs RIP on the page that has been received (304), and in one embodiment, compresses the page as well (306).

Now, the output buffer of this RIP component may not yet have sufficient space to store the page (308). Although the page-dispatching component 108 dispatched the page to the RIP component knowing that the RIP component is available to receive this page, the output buffer nevertheless may temporarily be unable to store the page. For example, if pages 5-10 are taking up 500 megabytes of a 512 megabyte output buffer, and page 11 needs 25 megabytes of space, the page-dispatching component 108 will nevertheless consider the RIP component as being available to accept page 11. This is because it is guaranteed that room will open up within the output buffer for storage of page 11, since pages 5-10 are lower than page 11 in the printed-page number order, and pages are retrieved by the page-retrieving component 110 in the printed-page number order.

Thus, if the output buffer does not yet have sufficient space to store the page (308), then the RIP component waits until the page-retrieving component 110 has retrieved enough of the pages that are stored in the output buffer such that room within the buffer opens up for this page. As has been noted, as pages are retrieved from the output buffers 114, they are removed from the buffers 114. Thus, at some point, it is guaranteed that the page will be able to be stored within the output buffer (310).

In one embodiment, the page is stored initially at the end of the output buffer. Other pages may have been stored at preceding locations within the output buffer. Therefore, in this embodiment, the output buffer is reordered in printed-page number order, so that the page having the lowest printed-page number is retrieved from the buffer next (312). As such, the output buffer is reorderable, and is not a FIFO buffer. For example, if pages 5 and 7 are already stored in the output buffer in order, and then page 6 is stored at the end of the output buffer, the order of the output buffer is now page 5, followed by page 7, followed by page 6. Because page 6 is before page 7 in the printed-page number order, the output buffer is reordered so that the order is page 5, followed by page 6, followed by page 7.

In another embodiment, rather than first storing a page at the end of the output buffer first in part 310 and then discretely performing reordering of the buffer thereafter (if needed) in part 312, parts 310 and 312 can be combined in a single part. That is, in this alternative embodiment, when a page is to be stored, it is stored in the output buffer in such a way that the printed-page number order of the pages stored in the output buffer is maintained, such that the lowest page in this order is retrieved next. Various pointers and other data structures and methodologies may be employed so that a page can be stored to ensure that the printed-page number order is maintained, as can be appreciated by those of ordinary skill within the art. For example, if pages 5 and 7 are already in the output buffer, a next-out pointer may point to page 5, and page 5 may point to page 7. When page 6 is added to the output buffer, the next-out pointer may still point to page 5, but page 5 is modified to point to page 6, and page 6 now points to page 7, to maintain the printed-page number order.

Figure 4:
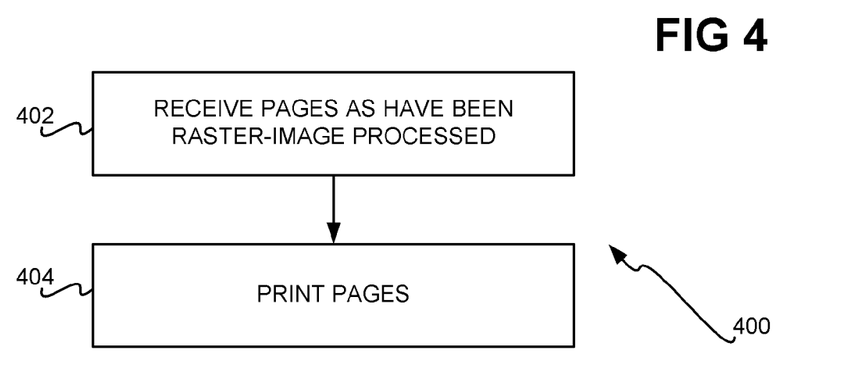
FIG. 4 is a flowchart of a method performed by a printing device to print pages upon which RIP has been performed, according to an embodiment of the invention.

Finally, FIG. 4 shows a method 400 that is performed by the printing device 116, according to an embodiment of the invention. Raster-image processed pages as have been raster-image processed by the RIP components 112, and retrieved (and decompressed in one embodiment) by the page-retrieving component 110 from the output buffers 114 are received by the printing device 116 from the page-retrieving component 110 (402). The pages are received in the printed-page number order. As the pages are received in this order, the printing device 116 prints the pages (404). That is, a printing engine forms images on media that correspond to the raster-image processed pages, where each page can be formed on one sheet of the media, and in the printed-page number order.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method comprising:
   predicting a raster-imaging processing (RIP) time for each page of a plurality of pages to be printed in a printed-page number order;
   sorting the pages based on when RIP should be finished for each page so that the pages are able to be printed in the printed-page number order without having to wait for RIP of the pages, and based on the RIP times of the pages as have been predicted;
   dispatching the pages to a plurality of RIP components for RIP of the pages in an order in which the pages have been sorted, such that each page is dispatched to a next RIP component that is available, each RIP component having an output buffer, a next RIP component being available for a given page to be dispatched thereto where a total size of the output buffer of the next RIP component minus space within the output buffer of the next RIP component taken up by any pages ordered after the given page in the printed-page number order is greater than a needed space to store the given page; and, retrieving the pages, as have been raster-image processed, from the output buffers of the RIP components in the printed-page number order and transmitting the pages to a printing device for printing the pages in the printed-page number order.

2. The method of claim 1, further comprising, initially:
receiving one or more print jobs encompassing the plurality of pages to be printed in printed-page number order, the plurality of pages received as formatted in accordance with a page description language (PDL) and that have to be raster-image processed before the printing device can print the pages; and,
splitting the plurality of pages from the print jobs received.

3. The method of claim 1, further comprising the printing device receiving and printing the pages as the pages are transmitted, such that the pages are printed in the printed-page number order.

4. The method of claim 1, further comprising, after retrieving each page from the output buffer of one of the RIP components and before transmitting the page to the printing device for printing, decompressing the page, where the pages are stored by the RIP components in the output buffers of the RIP components in a compressed manner.

5. The method of claim 1, wherein predicting the RIP time for each page comprises predicting the RIP time for a given page based on one or more attributes of the given page.

6. The method of claim 1, wherein sorting the pages based on the RIP completion times of the pages and taking into the RIP times of the pages as have been predicted comprises:
determining when RIP should be finished for each page, as the RIP completion time, where the RIP completion time of a given page occurs before the RIP completion times of any pages after the given page in the printed-page number order in which the pages are to be printed, and where the RIP completion time of the given page occurs after the RIP completion times of any pages before the given page in the printed-page number order in which the pages are to be printed;
determining when RIP should start for each page, as a RIP start time, where the RIP start time of a given page is determined based on the RIP completion time of the given page and on the RIP time of the given page as has been predicted; and,
sorting the pages in order of the RIP start times of the pages, such that the pages are not necessarily sorted in the printed-page number order.

7. The method of claim 6, wherein determining when RIP should be finished for each page, as the RIP completion time, comprises:
resetting a page counter;
repeating
setting the RIP completion time of a current page, the current page identified by the page counter in relation to the printed-page number order, the RIP completion time of the current page set equal to a specified printing start time for a print job encompassing the plurality of pages, plus a single page-printing time of the printing device multiplied by a difference value, the difference value equal to a difference between a page number of the current page in the printed-page number order and a page number of a first page in the printed-page number order; and,
advancing the page counter by one page, until the RIP completion times have been set for all the pages, wherein the single page-printing time of the printing device is a length of time that the printing device takes to print a single page.

8. The method of claim 6, wherein determining when RIP should start for each page, as the RIP start time, comprises:
resetting a page counter;
repeating
setting the RIP start time of a current page, the current page identified by the page counter in relation to the printed-page number order, the RIP start time of the current page set equal to the completion time of the current page minus the RIP time of the current page as has been predicted; and,
advancing the page counter by one page, until the RIP start times have been set for all the pages.

9. The method of claim 1, wherein the needed space to store the given page represents a size of the given page as has been raster-imaged processed and taking into account worst-case compression of given page has been raster-image processed.

10. The method of claim 1, further comprising:
a given RIP component raster-image processing a given page that has been dispatched to the given RIP component in parallel with the RIP components other than the given RIP component raster-imaging processing the pages that have been dispatched to the RIP components other than the given RIP component; and,
the given RIP component storing the given page as has been raster-image
processed, within the output buffer of the given RIP component.

11. The method of claim 10, further comprising the given RIP component compressing the given page as has been raster-image processed before storing the given page as has been raster-imaged processed within the output buffer of the given RIP component.

12. The method of claim 10, further comprising the given RIP component waiting for the output buffer of the given RIP component to have sufficient space to store the given page as has been raster-image processed before storing the given page as has been raster-image processed within the output buffer of the given RIP component,
wherein pages are removed from the output buffer of the given RIP component as the pages are retrieved from the output buffer of the given RIP component to free up space within the output buffer of the given RIP component.

13. The method of claim 10, further comprising the given RIP component reordering the output buffer of the given RIP component so that the pages as have been raster-imaged processed by the given RIP component are stored in the output buffer of the given RIP component in the printed-page number order, as opposed to the order in which the pages have been sorted, such that the page stored within the output buffer of the given RIP component that has a lowest printed-page number of any of the pages stored within the output buffer of the given RIP component is retrieved before any other pages stored within the output buffer of the given RIP component are retrieved.

14. The method of claim 10, wherein the given RIP component storing the given page as has been raster-image processed within the output buffer of given RIP component comprises storing the given page in the printed-page number order relative to any other pages already stored in the output buffer of the given RIP component, as opposed to the order in which the pages have been sorted, such that the page stored within the output buffer of the given RIP component that has a lowest printed-page number of any of the pages stored within the output buffer of the given RIP component is retrieved before any other pages stored within the output buffer of the given RIP component are retrieved.

15. A system comprising:
- a raster-image processing (RIP) time predicting component to predict a RIP time for each page of a plurality of pages to be printed in printed-page number order;
- a page-sorting component to sort the pages based on when RIP should be finished for each page so that the pages are able to be printed in the printed-page number order without having to wait for RIP of the pages, and based on the RIP times of the pages as have been predicted;
- a page-dispatching component to dispatch the pages to a plurality of RIP components for RIP of the pages in an order in which the pages have been sorted by the page-sorting component, such that each page is dispatched to a next RIP component that is available, each RIP component having an output buffer, a next RIP component being available for a given page to be dispatched thereto where a total size of the output buffer of the next RIP component minus space within the output buffer taken up by any pages ordered after the given page in the printed-page number order is greater than a needed space to store the given page; and,
- a page-retrieving component to retrieve the pages, as have been raster-image processed by the RIP components, from the output buffers of the RIP components, in the printed-page number order and to transmit the pages to a printing device for printing the pages in the printed-page number order.

16. The system of claim 15, further comprising the plurality of RIP components.

17. The system of claim 15, further comprising the printing device.

18. The system of claim 15, wherein the page-retrieving component is further to, after retrieving each page from the output buffer of one of the RIP components and before transmitting the page to the printing device for printing, decompress the page, where the pages are stored by the RIP components in the output buffers of the RIP components in a compressed manner.

19. The system of claim 15, wherein the pages that have been raster-imaged processed by a given RIP component are stored in the output buffer of the given RIP component in the printed-page number order, as opposed to the order in which the pages have been sorted, such that the page stored within the output buffer of the given RIP component that has a lowest printed-page number of any of the pages stored within the output buffer of the given RIP component is retrieved by the page-retrieving component before the page-retrieving component retrieves any other pages stored within the output buffer of the given RIP component, and
- wherein the pages are removed from the output buffer of the given RIP component as the page-retrieving component retrieves the pages from the output buffer of the given RIP component, to free up space within the output buffer of the given RIP component.

20. An article of manufacture comprising:
- a tangible computer-readable medium; and,
- one or more computer programs stored within the medium to perform a method comprising:
- predicting a raster-imaging processing (RIP) time for each page of a plurality of pages to be printed in printed-page number order;
- sorting the pages based on when RIP should be finished for each page so that the pages are able to be printed in the printed-page number order without having to wait for RIP of the pages, and based on the RIP times of the pages as have been predicted;
- dispatching the pages to a plurality of RIP components for RIP of the pages in an order in which the pages have been sorted, such that each page is dispatched to a next RIP component that is available, each RIP component having an output buffer, a next RIP component being available for a given page to be dispatched thereto where a total size of the output buffer of the next RIP component minus space within the output buffer of the next RIP component taken up by any pages ordered after the given page in the printed-page number order is greater than a needed space to store the given page; and,
- retrieving the pages, as have been raster-image processed, from the output buffers of the RIP components in the printed-page number order and transmitting the pages to a printing device for printing the pages in the printed-page number order,
- wherein the pages that have been raster-imaged processed by a given RIP component are stored in the output buffer of the given RIP component in the printed-page number order, as opposed to the order in which the pages have been sorted, such that the page stored within the output buffer of the given RIP component that has a lowest printed-page number of any of the pages stored within the output buffer of the given RIP component is retrieved before any other pages stored within the output buffer of the given RIP component are retrieved.

* * * * *